March 28, 1950

C. H. KREBS 2,501,849

SINGLE CLOSURE FOR BOTTLES

Filed May 22, 1947

INVENTOR.
CHARLES H. KREBS.
BY
Joseph B. Lindecker.
ATTORNEY.

Patented Mar. 28, 1950

2,501,849

UNITED STATES PATENT OFFICE 2,501,849

SINGLE CLOSURE FOR BOTTLES

Charles H. Krebs, Chicago, Ill., assignor to Standard Cap and Seal Corporation, Chicago, Ill., a corporation of Virginia Application May 22, 1947, Serial No. 749,674

7 Claims. (Cl. 215—38)

This invention relates to bottle sealing devices and more particularly to a bottle closure of simple design and construction, particularly for use with bottles containing milk and milk products in the dairy industry.

The closure industry has long sought to provide a satisfactory single closure for receptacles, which closure would have the required qualities necessary to provide a sanitary closure, a tamper-proof seal, a closure easily opened by children as well as adults, and a closure especially adapted to be used with homogenized milk.

Since the advent of homogenized milk, there has not been a closure, particularly a single closure, which has been thoroughly satisfactory for sealing homogenized milk.

Homogenized milk is milk which has been treated in such a manner as to insure break-up of the fat globules to such an extent that after 48 hours storage no visible cream separation occurs on the milk and the fat percentage of the top 100 cc. of milk in a quart bottle, or of proportionate volumes in containers of other sizes, does not differ by more than 5 percent of itself from the fat percentage of the remaining milk as determined after thorough mixing.

During the process of homogenizing milk, a quantity of air is entrapped within the milk; some of this air is dissolved and some is held in colloidal suspension. Since the homogenizing process is done just prior to bottling and sealing, this entrapped and dissolved air does not have time enough to escape from the milk and is therefore sealed together with the milk in the container. Upon standing and/or changing of the temperature of the freshly bottled milk, this air gradually begins to escape from the milk. If the closure is hermetically sealed, a pressure is built up inside the bottle. The extent of this pressure is dependent upon several factors, namely: (1) amount of air entrapped and dissolved in the milk at the time of sealing; (2) size of the air space between the closure and the upper surface of the bottled milk; (3) volume of milk sealed in the container; (4) extent of temperature change of the milk upon standing; and (5) construction of the closure to withstand pressure.

Factor one is dependent upon the type of homogenization, the pressure of homogenization, the time interval between homogenization and bottling, and the type of filler used in bottling. Factor two is dependent upon the type of bottle used, the height of fill and the type of closure used; as, for example, a disc cap would leave substantially zero air space. Factor three is important because a half-gallon bottle has approximately the same air space between the closure and the milk as a half-pint bottle of the same type; yet the volume of milk expanding and emitting air is eight times that of the smaller bottle.

Factor four depends upon the season and the difficulties encountered by the dairy and dairy products merchants to furnish milk which will comply with the U. S. Public Health code. This code specifies that milk or milk products must be maintained at 50° F. or less until sold. This is approximately 10° F. over the filling temperature. However, this regulation does not control the temperature variations which may occur subsequently to sale and prior to opening of the bottle by the housewife. In certain adverse conditions, the temperature of the bottle of milk may rise to 70° F. or more. Factor five is dependent upon the design and the economics of manufacture of the closure. Extra heavy closures may be thoroughly satisfactory from sealing standpoint, but there is the disadvantage of having a closure which would be too expensive to use.

If the closure hermetically seals the bottle of milk and no air or other gas is allowed to escape, a pressure of eight to ten pounds could develop in a large size bottle having a small air space above the milk. With a five cubic centimeter air space between the closure and the milk with a quart bottle, tests made by the applicant have shown a pressure of six pounds per square inch on a temperature rise of 20° F., and as the initial air space is decreased, the potential pressure increases in a logarithmic progression.

The main object of this invention is to provide a closure for milk bottles or the like which will satisfactorily seal the bottle and at the same time permit the passage of air, or gas, from the interior of the bottle when a pressure above atmosphere is developed within the bottle, as by the expansion of the contents thereof, without destroying the normal effective liquid sealing properties of the closure.

Further, it is one of the objects of this invention to provide a means to minimize the pressure which may develop as described above by incorporating a gas permeable sheet as the inner liner of a closure on a bottle, said sheet acting as a gas vent between the interior of said bottle and the exterior atmosphere but capable of maintaining a liquid seal.

Another object of this invention is to provide simple and efficient means for providing vent passages within the closure, and not on the inner surface thereof, with no additional cost over the cost of conventionally constructed caps.

Another object of this is to improve the construction illustrated by one of my prior patent applications relating to means for and method of capping containers, namely: "Single closure for containers and the like," Serial No. 682,623, filed July 10, 1946.

Other objects and advantages will appear from the following discussions and description taken in connection with the accompanying drawings.

In this invention the closure is fabricated from a laminated material composed of paper, foil and a laminating compound in which microcrystalline wax is the majority ingredient. Similar lamination is mentioned in application, Serial Number 682,623, filed July 10, 1946, now on file in the Patent Office. Such lamination as mentioned in the aforesaid application is limited to at least one layer of paper being wet strength. While this invention includes such a lamination, it is not intended to be limited to such material. It is, however, to be limited to such a paper for the inside layer as is included in the term machine glazed papers, or any other paper which has a different porosity on one side thereof than on the opposite side thereof. Machine glazed papers have been proven in the paper industry to have entirely different characteristics on opposite sides. The glazed side is more dense and the fibers are laid down in such a manner that the surface is smooth and consequently, the derivation of the name "machine glazed." The opposite side is rough, having little or no machine finish, other than action of the felt pick-up during manufacture and the raised fibers caused by the steam being driven through the sheet during drying. Since the smooth side is quite dense, when a waxy material such as the laminant is applied to this surface, very little penetration will result so that the laminant material will be near the upper surface and leave the remainder of the sheet devoid of this material. The rough side will then be on the lower outside surface of the closure, will be next to the milk and will make the seal with the bottle mouth. This rough surface being uncoated attracts the milk or other dairy product and completes the seal, making it liquid tight. However, since the paper itself is highly sized at the time of manufacture, the milk will not penetrate into the fibers. Consequently, a dry layer remains between the outside lower surface and the smooth side which carries the laminant. This dry layer acts as a gas relief valve and permits passage of gas or air but not of liquid. Since the rough surface of the paper which is in contact with the container is sealed by the liquid in the container, and the smooth surface is sealed by the laminant to the foil, the inner dry layer may be said to be a gas permeable fibrous gasket permitting the passage of gasses between the interior of the container and the exterior immediately surrounding the periphery of the skirt of the closure. Previous vented closures as mentioned above, rely entirely on grooves or other similar fabricated vents which permit passage of the gas between the closure and the container surface adjacent to the closure, rather than on the inherent structure of paper as invented by the applicant.

Drastic and extensive tests have shown this dry layer to be present, and have also shown that the container sealed with this closure is free of pressure, even though the contents were warmed to a temperature more than 40° F. over the initial bottling temperature. During these tests, no milk leaked from the container, although no other commercial closure could withstand the same test without leaking.

Such a paper as described above may be combined either with paper and foil to make a laminated sheet suitable for fabrication into closures, or may be combined with foil to make a closure with a foil exterior.

To the accomplishment of the foregoing and such other objects as may hereinafter appear, my invention consists in the elements and their relation one to the other, as hereinafter particularly described and sought to be defined in the claims, reference being made to the accompanying drawings which show a preferred embodiment of my invention and in which:

Figure 1:
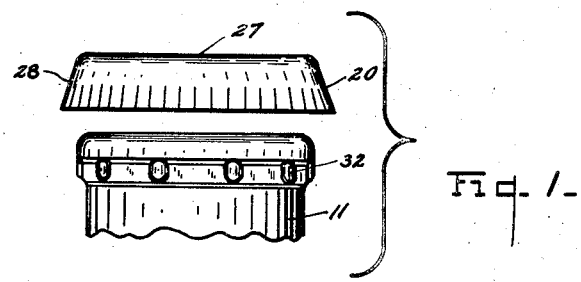
Figure 1 is a side view of the upper portion of a milk bottle, a closure being shown above it in position to be applied to it.

Referring to the drawings, the figures show a preferred form of a composite closure for dairy products. Reference numeral 10 designates a lamina of paper and shown in Figure 2 as the exterior lamina of a closure 20. This exterior layer of paper 10 may be printed by any suitable means to provide the usual advertising. This top layer with printing thereon is preferably covered by a coating of waxy material 15, said material consisting principally of paraffin wax.

Figure 3:
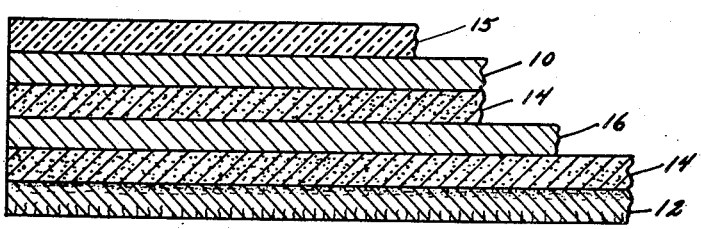
Figure 3 is a sectional view greatly enlarged, showing the laminated material as used in the cap shown in Figure 1.

According to one form of the invention, the composite material, as shown in Figure 3, consists of two laminae of paper 10 and 12, coated with water-insoluble material 14, having a lamina of aluminum foil 16 pressed between said laminae of paper and coatings. The aluminum foil 16 acts as a barrier between the layers of the water-insoluble material 14 upon said layers of paper 10 and 12.

Figure 2:
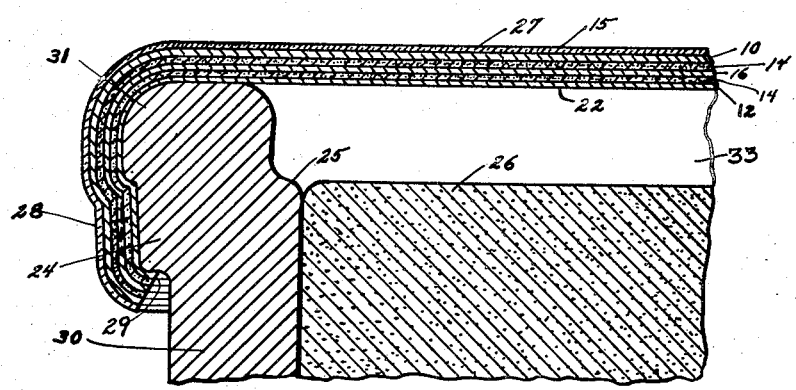
Figure 2 is a vertical section through a portion of a milk bottle showing the cap of Figure 1 applied thereto.

The laminated material shown in Figure 2 of the drawing and described above, is especially shown enlarged in Figure 3. A portion of the lower laminae of paper 12 and a portion of water-insoluble material 14 is shown in a further enlarged view in Figure 4. The laminae of paper 12 in this invention is of a type of paper included in the term machine glazed paper, or any other paper which has a different porosity on one side thereof than on the opposite side thereof. The glazed side 17, of the paper 12, is more dense and the fibers 21 thereof are pressed down in substantially a horizontal plane and in such a manner that the surface of said glazed side 17 is smooth. The opposite side 18 of the paper 12 has little or no machine finish and has a rough finish as shown by curved surface line 22. The fibers 23 adjacent this rough surface 22 are generally in a vertical plane with respect to the horizontal surface thereof. The water-insoluble material 14 in contact with surface 17 does not penetrate to any extent into the dense fibrous paper and thus leaves the greater portion of the paper lamina 12 devoid of the water insoluble material 14.

In order to clarify the term "water-insoluble material," there is hereinafter set forth an example thereof which has given satisfactory results. It is to be understood that this example is illustrative and not limitative of this invention.

*Example*

| | Per cent |
|---|---|
| Microcrystalline wax | 75 |
| Hydrogenated rosin | 25 |

The two ingredients are melted together and blended by stirring in a steam-jacketed tank, from which it is drawn for use in the coating tanks on the laminating machine. Such water-insoluble material is applied to one side of each of the paper laminae in molten form by roll coaters.

Each of the paper laminae that are used must have the property of moldability to make a satisfactory closure. In addition, the water-insoluble material must also have said properties, as the coated layer on each of the paper laminae must impart a moldability to the finished closure. Since the moldability of the finished closure is dependent upon each of the laminae, the coated layers must be kept separate to obtain maximum efficiency and still have a plurality of layers of the water-insoluble material. For this purpose, a barrier is used between the layers of coating, said barrier also aiding in the moldability of the finished closure. Said barrier may consist of suitable material such as metal foil as is shown in one form of this invention. Aluminum foil not over .003 inches in thickness has been found to be very satisfactory as a barrier.

Figure 4:
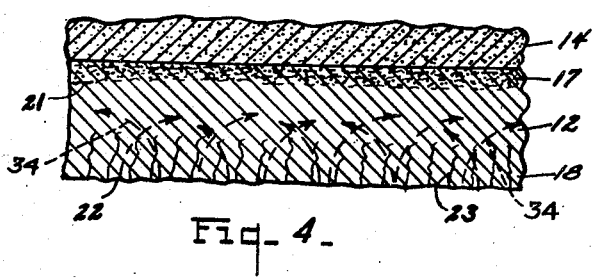
Figure 4 is a sectional view greatly enlarged, showing the bottom layer of the laminated paper, with waxy laminating compound applied to the upper surface thereof, as shown in Figure 3.

In Figure 2 the invention is shown applied to a milk bottle 24 having a neck portion 30 and pouring lip 31, spaced projections 32, with internal ledge 25, and filled to said ledge with milk 26. The closure 20 has a central portion 27, a peripherial skirt portion 28, and peripherial edge portion 29. When the closure is placed on the bottle having finishes of the type shown in United States Patents 1,796,728 and 1,796,729, or the like, and lateral inward pressure is applied to its skirt 28 by means of a capping machine such as described by Patent 2,112,842, the skirt will necessarily be forced into intimate contact with the surface of the bottle pouring lip 31 and around any form of detents carried below and adjacent thereto. This type of closure provides a closure for milk bottles which will satisfactorily seal said bottle. This invention provides a closure which will not only seal the bottle but provides a means to permit the passage of air or gas from the interior of the bottle when a pressure other than that of the atmosphere is developed. When air or gas pressure is built up in the space 33 between the top surface of the milk 26 and the under surface 18 of the inside laminae 12, said gas will penetrate into the interior of laminae 12 close to fibers 23 therein, said gas will then come in contact with the dense fibers 21 of the glazed side 17 and be stopped from further movement through the closure; the gas will then seek the path of least resistance which will be to take the path shown by dotted arrows 34, as shown in Figure 4, and travel along through the lamina 12 between the surfaces 17 and 18 to the peripherial edge portion 29 of the closure 20. This dry passageway within the laminae 12 acts as a gas relief valve, permitting the passage of gas or air under pressure but not the passage of a liquid. Previous vented or grooved closures disclosed in the prior art rely on grooves or vents which permit the passage of the gas under pressure between the closure and the container surface adjacent the pouring lip thereof, said grooves will not only allow the passage of gas under pressure, but will also allow liquids to travel therethrough as well and cause a defective seal between the closure and the bottle.

The advantages of this invention must readily appear in that it satisfies the strong demand for inexpensive closures to be applied to reuseable glass bottles. With this novel closure, with the relationship of the skirt and bottle head, no tool will be required to remove the closure, thus preventing damage to the bottle and allowing the customer to remove the closure by hand with added satisfaction.

Though the invention has been described with particular reference to the forms of a laminated material, it is not restricted thereto.

Since it is obvious that various changes and modifications may be made in the above description without departing from the nature and spirit thereof, this invention is not restricted thereto except as defined in the appended claims, and what I claim as new and desire to have protected by Letters Patent, is:

1. A skirted closure for bottles, comprising an intermediate layer of thin metal foil, a thin layer of paper secured to each side of the metal foil by a layer of water-insoluble material interposed there between, the bottom layer of paper being machine glazed paper with glazed side in contact with said water-insoluble materials and forming the inner layer of said closure, said inner layer with minute passages within its limits acting as gas vents between the interior of said bottle and the exterior thereof when applied to a bottle containing a liquid and a gas without permitting the liquid contents of the bottle to pass therethrough, substantially as described.

2. A skirted closure for milk bottles, said closure being of a laminated construction comprising superposed laminations consisting respectively of paper, metal foil, and machine glazed paper in the order mentioned, with interposed layers of water-insoluble material between said laminations and bonding them together, said machine glazed paper serving as the inner layer of the closure and being arranged with the glazed side in contact with said water-insoluble material, leaving the rough side thereof to form the inside surface of the closure, said inside surface being gas permeable and liquid impermeable, thereby resulting in the formation of a gas vent to allow passage of gas between the interior of said bottle and the exterior thereof, thereby equalizing the internal and external pressures.

3. A skirted closure for milk bottles, said closure being of a laminated construction comprising superposed laminations consisting respectively of paper, metal foil, and machine glazed paper in the order mentioned, with interposed layers of water-insoluble material between said laminations and bonding them together, said machine glazed paper serving as the inner layer of the closure and being arranged with the glazed side in contact with said water-insoluble material, leaving the rough side thereof to form the inside surface of the closure, said inside surface being gas permeable and liquid impermeable, thereby resulting in the formation of a gas vent through the central lateral portion of said inner layer, thereby equalizing the internal and external pressures.

4. A laminated, skirted closure for milk bottles containing homogenized milk, said milk having partially entrapped air therein, said closure comprising an intermediate lamina of thin metal foil and a lamina of paper secured to each side of said metal foil by suitable means, one of said paper laminae forming the inner lamina of the closure, said laminae being substantially coextensive, said closure adapted to fit snugly around the upper rim of said bottle and having its skirt pressed into conformity with said rim to maintain the closure in sealing contact therewith, said inner lamina of paper being machine glazed paper with its rough surface forming the inner surface of the closure and providing within its own limits a passage to permit the escape of gas from the interior of the bottle to the exterior thereof when a pressure above that of the atmosphere is developed within a bottle, without destroying the liquid-sealing properties of the closure.

5. A skirted closure for bottles containing a liquid and a gas, said closure being composed of suitable material and providing a three ply closure, the intermediate lamina being composed of thin metal foil, the upper and lower laminae being lamina of paper, the three laminae being substantially coextensive, said closure adapted to fit snugly around the upper rim of said bottle and having its skirt portion turned downwardly and pressed under the rim and shaped into conformity therewith to maintain the closure in sealing contact with said rim, said inner lamina of paper being machine glazed paper with its rough surface forming the inner surface of the closure and providing means entirely confined within its limits to permit the passage of said gas from the interior of the bottle to the exterior thereof, when a pressure above that of the atmosphere is developed within the bottle, without destroying the liquid-sealing properties of the closure.

6. A laminated skirted closure for bottles, comprising an intermediate layer of thin foil, a thin layer of paper secured to the under side of said metal foil by having on its upper surface a coating of water-insoluble material, said laminae being substantially coextensive, said closure adapted to fit snugly upon the upper rim of said bottle with said skirt pressed into conformity with said rim, said inner layer of paper being machine glazed paper with its rough surface forming the inner surface of the closure and being uncoated on its lower surface, forming the inner layer of the closure and providing a gas permeable surface, said layer with minute passages within its limits acting as gas vents between the interior of said bottle and the exterior thereof when applied to a bottle containing a liquid and a gas without permitting the liquid contents of the bottle to pass therethrough; substantially as described.

7. A laminated bottle closure for use with a bottle having a head, said laminated closure closing and covering said head and having a depending annular down-turned marginal skirt portion fitting and contracted under said head and held in closure securing form and condition by the directly contracting portions of said skirt merged together by the ability of the laminated material to retain the molded form thereof, said closure comprising an intermediate lamina of thin metal foil, and a thin lamina of paper secured to the under side of the metal foil by a layer of water-insoluble material interposed therebetween, said lamina of paper being machine glazed paper with the glazed side in contact with said water-insoluble material and forming the inner layer of said closure, said laminae being substantially co-extensive, said inner lamina of paper provided with minute passageways in the interior thereof in communication with the interior of the bottle containing a liquid and a gas and adapted to permit the passage therethrough of a gas when an abnormal pressure is present within the bottle.

CHARLES H. KREBS.

REFERENCES CITED

The following references are of record in the file of this patent:

UNITED STATES PATENTS

| Number | Name | Date |
|---|---|---|
| 1,144,589 | Fay | June 29, 1915 |
| 1,257,710 | Januchowsky | Feb. 26, 1918 |
| 1,335,538 | Levander | Mar. 30, 1920 |
| 1,732,958 | Warth | Oct. 22, 1929 |
| 2,005,349 | Raney | June 18, 1935 |
| 2,121,951 | Clark | June 28, 1938 |

FOREIGN PATENTS

| Number | Country | Date |
|---|---|---|
| 402,313 | Great Britain | Nov. 30, 1933 |
| 419,684 | Great Britain | Nov. 16, 1934 |